United States Patent [19]
Every

[11] Patent Number: 5,449,049
[45] Date of Patent: Sep. 12, 1995

[54] ANTI-LOCK BRAKE SYSTEM USING ENGINE TORQUE TO DETECT THE TRANSITION OF THE DRIVEN WHEELS FROM A LOW FRICTION TO A HIGH FRICTION ROAD SURFACE

[75] Inventor: Peter Every, Livonia, Mich.

[73] Assignee: Kelsey-Hayes, Romulus, Mich.

[21] Appl. No.: 383,053

[22] Filed: Feb. 3, 1995

[51] Int. Cl.⁶ .......................... B60K 28/16; B60T 8/32
[52] U.S. Cl. ........................... 180/197; 364/426.01; 364/426.02; 364/426.03; 364/426.04; 364/426.05
[58] Field of Search ................. 180/197; 364/426.01, 364/426.02, 426.03, 426.04, 426.05

[56] References Cited
U.S. PATENT DOCUMENTS

| | | | |
|---|---|---|---|
| 3,980,346 | 9/1976 | Leiber | 303/115.4 |
| 4,673,226 | 6/1987 | Every et al. | 303/109 |
| 5,126,942 | 6/1992 | Matsuda | 180/197 |
| 5,131,729 | 7/1992 | Wetzel | 303/113.5 |
| 5,309,362 | 5/1994 | Ito et al. | 180/197 |
| 5,311,433 | 5/1994 | Igata et al. | 180/197 |
| 5,366,039 | 11/1994 | Sawada | 180/197 |

*Primary Examiner*—Mitchell J. Hill
*Attorney, Agent, or Firm*—Brooks & Kushman

[57] ABSTRACT

An anti-lock braking system having an anti-lock braking control which periodically increases the speed of the engine during the anti-lock mode of operation. The anti-lock braking control detects the deceleration of the driven wheel speed when each periodic increase in engine speed is terminated, to detect the transition in the driven wheels from a low friction road surface to a high friction road surface. Upon the detection of the transition to a high friction road surface, the anti-lock brake control terminates the increased engine speed and increases the brake fluid pressure to the driven wheel actuators to maintain maximum anti-lock braking torque.

18 Claims, 1 Drawing Sheet

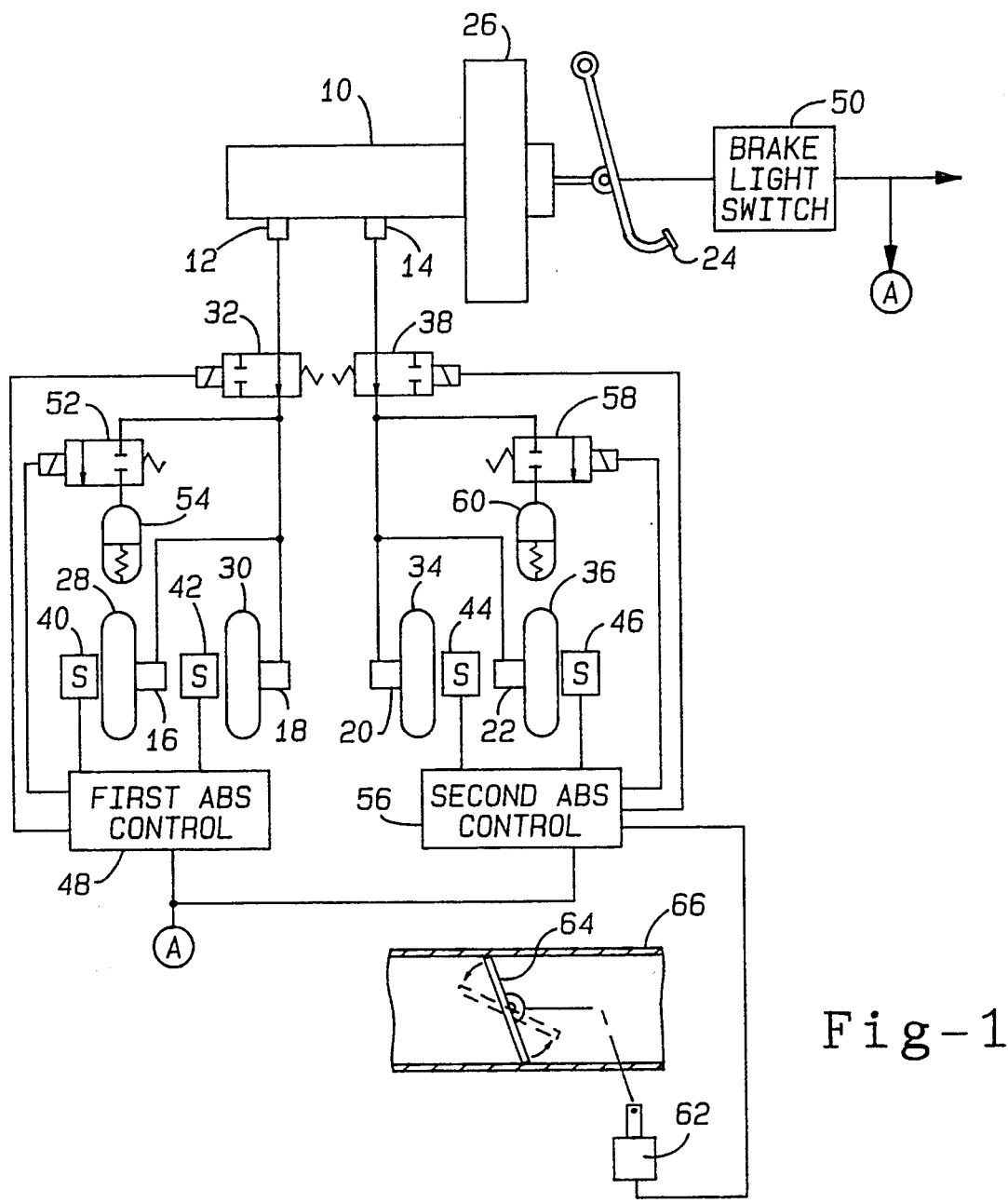
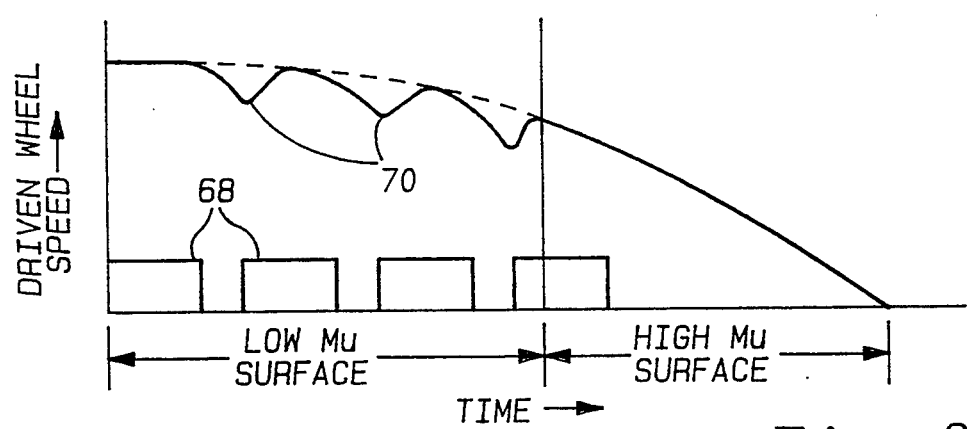
Fig-1
Fig-2

ANTI-LOCK BRAKE SYSTEM USING ENGINE TORQUE TO DETECT THE TRANSITION OF THE DRIVEN WHEELS FROM A LOW FRICTION TO A HIGH FRICTION ROAD SURFACE

TECHNICAL FIELD

The invention is related to the field of anti-lock brake systems and, in particular, to an anti-lock brake system using engine torque to detect the transition of the driven wheels from a low friction to a high friction road surface.

BACKGROUND ART

Most anti-lock brake systems (ABS) cycle the brake fluid pressure to brake actuators to ascertain that the highest level of the tire to road adhesion is utilized. To cycle the brake fluid pressure to the brake actuators, the prior art, such as taught by Wetzel in U.S. Pat. No. 5,131,729 or in Leiber, U.S. Pat. No. 3,980,346, use a separate hydraulic pump driven by an electric motor. In U.S. Pat. No. 4,673,226, Every et al. teaches an anti-lock brake system in which only the driven wheels are controlled in an anti-lock mode, and the non-driven wheels are braked in a conventional manner. The transition of the driven wheels from a low friction (low mu) road surface to a high friction (high mu) road surface is detected by a decrease in the rotational speed of the driven wheels caused by the normally braked non-driven wheels engaging the high friction road surface which abruptly slows the vehicle's speed. However, the application of the anti-lock brake system taught by Every et al. to all four wheels of the vehicle has been inhibited by a means for detecting the transition of the wheels being braked from a low friction to a high friction surface.

The invention described herein allows for the detection of the transition of the wheels being braked from a low friction to a high friction surface when the braking system is in an anti-lock mode of operation.

SUMMARY OF THE INVENTION

The invention is an anti-lock braking system for a four wheel vehicle having a pair of non-driven wheels and a pair of driven wheels, an engine providing a driving torque to driven wheels, a brake actuator associated with each wheel and a master brake cylinder for providing pressurized brake fluid to the brake actuators for supplying a braking torque to the wheels. The braking system has a first normally open isolation valve disposed between the master cylinder and the brake actuators associated with the non-driven wheels, a first normally closed dump valve connected to the brake actuators associated with the non-driven wheels and wheel speed sensors generating wheel speed signals indicative of the rotational speed of the non-driven wheels. An anti-lock brake control has means for detecting a lock-up condition of the non-driven wheels in response to the wheel speed signals, means responsive to the detection of a lock-up condition of the non-driven wheels to selectively close the first isolation and selectively open the first dump valve to control the pressure of the brake fluid applied to the brake actuators associated with the non-driven wheels to maintain maximum braking torque without lock-up.

The braking system also has a normally open second isolation valve connected between the master cylinder and the brake actuators associated with the driven wheels, a normally closed second dump valve connected to the brake actuators associated with the driven wheels and wheel speed sensors generating wheel speed signals indicative of the rotational speed of the driven wheels. A second anti-lock braking control has means for detecting a lock-up condition of the driven wheels in response to the wheel speed signals, means for periodically increasing the driving torque being applied to the driven wheels, means for selectively closing the second isolation valve and selectively opening the second dump valve to control the brake fluid pressure being applied to the brake actuators associated with the driven wheels to maintain maximum braking torque without lock-up, and means responsive to said wheel speed signals indicating a decrease in the rotational speed of the driven wheels being less than a predetermined value in response to the termination of the increased driving torque being applied to the driven wheels to terminate the periodic increasing of the driving torque and to open the second isolation valve to increase the fluid pressure being applied to the brake actuators associated with the driven wheels. The predetermined value of the decrease in the wheel speed of the driven wheels is selected to indicate the transition of the driven wheels from a low friction to a high friction road surface.

In the preferred embodiment, the second anti-lock control delays the closing of the second isolation valve to supply an increased brake fluid pressure to the brake actuators associated with the driven wheels to compensate for the increased torque being applied to the driven wheels by the engine.

A first object of the anti-lock braking system is to provide a mechanism for detecting the transition of the driven wheels from a low friction to a high friction road surface.

Another object of the anti-lock braking system is to eliminate the requirement of a separate hydraulic pump and electric motor to cycle the brake fluid pressure to the brake actuators.

Another object is an anti-lock braking system in which the transition of the driven wheels from a low friction to a high friction road surface is accomplished by periodically cycling the driving torque being applied to the driven wheels.

Yet another object of the anti-lock brake system is to periodically change the position of the engine's throttle valve during the anti-lock mode of operation to periodically increase the driving torque being applied to the driven wheels.

These and other objects of the invention will become more apparent from a reading of the detailed description of the invention in conjunction with the drawings.

BRIEF DESCRIPTION OF THE DRAWINGS

FIG. 1 is an electrical and hydraulic schematic of the anti-lock braking system; and FIG. 2 is a graph showing the wave form of the driven wheel speed prior to and after the transition of the driven wheels from a low friction to a high friction road surface.

BEST MODE FOR CARRYING OUT THE INVENTION

FIG. 1 shows the details of the anti-lock brake system for a four wheeled vehicle. The vehicle may be a front wheel drive vehicle, a rear wheel drive vehicle, or a four wheel drive vehicle. Considering first a front or rear wheel drive vehicle having a pair of driven wheels and a pair of non-driven wheels. The anti-lock brake system has a conventional master brake cylinder 10 which has two outlet ports 12 and 14. The outlet ports 12 and 14 provide pressurized brake fluid to brake actuators 16–22 in response to the depression of a brake foot pedal 24. A vacuum brake booster 26, of the type known in the art, is connected between the input to the master brake cylinder 10 and the brake foot pedal 24 and increases the braking force applied to the input of the master cylinder 10 in a conventional manner.

The outlet port 12 is hydraulically connected to the brake actuators 16 and 18 of the non-driven wheels 28 and 30, respectively, through a first two position, normally open isolation valve 32. In a similar manner, outlet port 14 is connected to the brake actuators 20 and 22 of the driven wheels 34 and 36 through a second two position, normally open isolation valve 38. The isolation valves 32 and 38 are solenoid actuated valves spring-biased to an open state which hydraulically connects the outlet ports 12 and 14 to the brake actuators 16–22 and which are electrically actuated to a closed state hydraulically isolating the brake actuators 16–22 from the output ports of the master brake cylinder 10.

Wheel speed sensors 40 and 42 are associated with the non-driven wheels 28 and 30, respectively, and generate wheel speed signals having values indicative of the rotational velocity of the associated wheels. Wheel speed sensors 44 and 46 are associated with the driven wheels 34 and 36, respectively, and generate wheel speed signals having values of the rotational velocity of the associated wheels.

The wheel speed signals generated by wheel speed sensors 40 and 42 associated with the non-driven wheels are transmitted to a first ABS (anti-lock brake system) control 48, which is of the type described by Every et al. in U.S. Pat. No. 4,673,226, incorporated herein by reference. The first ABS control 48 is responsive to a brake signal generated by a brake light switch 50 closed in response to the depression of the brake pedal 24 and the wheel speed signals generated by the wheel speed sensors 40 and 42 to detect the occurrence of a lock-up condition of one or both of the non-driven wheels 28 or 30. When a lock-up condition of either of the non-driven wheels is detected, the first ABS control 48 selectively activates isolation valve 32 to the closed state and the isolation valve 32 holds the fluid pressure being applied to the brake actuators 16 and 18 at a relatively constant value. If the deceleration of either or both of the non-driven wheels exceeds a predetermined value indicative of a lock-up condition, the first ABS control 48 will selectively activate a normally closed dump valve 52 to the open state to enable a predetermined quantity of brake fluid to flow into an accumulator 54 and thereby reduce the fluid pressure being applied to the brake actuators 16 and 18. This activation of the dump valve is repeated until a maximum non-lock-up braking torque is applied to the non-driven wheels. After the isolation valve 32 is closed and the lock-up condition alleviated, the first ABS control 48 will hold the isolation valve 32 in the closed state and deactivate the dump so that the brake fluid pressure being applied to the brake actuators 16 and 18 is controlled to provide a maximum non-locking braking torque until a subsequent lock-up condition is detected or the brake pedal 24 is returned to its rest position terminating the brake signal generated by the brake light switch 50.

The wheel speed signals generated by wheel speed sensors 44 and 46 associated with the driven wheels are transmitted to a second ABS control 56 which also is the type described by Every et al. in U.S. Pat. No. 4,673,226. The second ABS control 56 will selectively actuate a normally open isolation valve 38 and a normally closed dump valve 58 as previously described relative to the first ABS control 48. An accumulator 60 is connected to the dump valve 58 and like accumulator 54 is preferably a spring-loaded or air-loaded accumulator.

The first and second ABS controls, 48 and 56, respectively, are connected to each other such that the detection of a lock-up condition by one or the other of the ABS controls will place both ABS controls in the anti-lock brake control mode of operation.

The second ABS control will also generate pulse throttle signals 68, as shown in FIG. 2, which repeatedly activates, then deactivates a throttle position solenoid 62 to periodically rotate the throttle valve 64 in the air intake manifold 66 of the vehicle's engine (not shown) from an idle position to a predetermined open position indicated in phantom in the drawing. This opening of the throttle valve will cause an increase of the engine speed by a preselected amount, for example, to a speed equal to the vehicle speed, thereby increasing the torque being applied to the driven wheels 34 and 36 by the engine. The increased torque being applied to the driven wheels will, in turn, require a higher brake fluid pressure to be applied to the brake actuators 20 and 22 to cause the deceleration of driven wheels 34 and 36 to exceed the predetermined value.

To provide this higher brake fluid pressure to the brake actuators, the second ABS control 56 will delay the activation of isolation valve 38 to the closed position relative to the detection of the lock-up condition. This will result in brake fluid pressure being applied to the brake actuators 20 and 22 of the driven wheels 34 and 36 being higher than the brake fluid pressure being applied to the brake actuators 16 and 18 of the non-driven wheels. The delay in the activation of isolation valve 38 and the increase in the driving torque being applied to the driven wheels are variable as a function of the engine horsepower and the size and the weight of the vehicle. With the exception of the higher brake fluid pressure being applied to brake actuators 20 and 22 and the increased driving torque being applied to the driven wheels 34 and 36 as a result of the activation of the throttle solenoid 62, the first and second ABS controls 48 and 50 will operate as they normally do.

The first and second ABS controls 48 and 56 will also estimate from the wheel speed signals an average vehicle deceleration. When the average deceleration is above a preselected value, such as 0.5 g, the throttle signals are terminated, terminating the added torque being applied to the driven wheels by the engine. As long as the vehicle continues on a low mu surface such as a gravel, wet, snow-covered or icy surface, the reduction of the driven torque applied to the driven wheels by the engine will produce disturbances 70 in the wheel speed of the driven wheels when the throttle solenoid is deactivated as depicted in the graph shown in FIG. 2.

In FIG. 2, the second ABS control 56 is assumed to be working normally and the changes in the speed of the driven wheels 34 and 36 due to the normal operation of the second ABS control 56 are not shown. When the throttle solenoid is deactivated on a low mu surface, the increased torque being applied to the driven wheels by the engine ceases and the increased brake fluid pressure applied to the brake actuators 20 and 22 of the driven wheels will result in a rapid increase in the deceleration in the speed of the driven wheels, causing the disturbances 70. In response to this increase in the deceleration of the driven wheels, the second ABS control 56 will again activate the throttle solenoid 62 for a short period of time. This activation and deactivation of the throttle solenoid 62 will continue until the average vehicle deceleration is greater than below the preselected value. This preselected value indicates the driven wheels are engaging a high friction (high mu) surface such as a dry concrete or dry black top surface.

When the driven wheels move from a low mu surface to a high mu surface, the deactivation of the throttle valve 62 will have little or no effect on the deceleration of the driven wheels 34 and 36 due to the increased friction between the driven wheels and the higher mu surface. This increased friction will absorb the additional braking force induced by the brake actuators 20 and 22 as a result of the termination of the increased torque being applied to the driven wheels 34 and 36 by the engine. When the deenergizing of the throttle solenoid 62 and the reduction of the torque to the driven wheels by the engine has little or no effect on the deceleration of the driven wheels, the second ABS control 56 will terminate the throttle signals applied to the throttle solenoid 62 and will control the brake fluid pressure being applied to the brake actuators by selectively actuating and deactuating isolation valve 38 and dump valve 58 as described in U.S. Pat. No. 4,673,226. The second ABS control will also generate a signal to the first ABS control to signify the wheels are engaging a high friction road surface. In response to this signal, the first ABS control will increase the brake fluid pressure being applied to the non-driven brake actuators to maximize the braking torque being applied to the non-driven wheels.

In an alternative mode of operation, both isolation valves 32 and 38 may be simultaneously activated to their closed position by the first and second ABS controllers 48 and 56, respectively, in response to detecting a lock-up condition. At the same time, the second ABS control will also generate the pulsed throttle signals as before. When the initial braking starts on a low mu surface and transits to a high mu surface, releasing the throttle valve will have little or no effect on wheel speed and the second ABS system will discontinue the torque pulses to the driven wheels. Simultaneously, the first and second ABS controls will periodically deenergize isolation valves 32 and 38 to their open position to increase the brake fluid pressure being applied to brake actuators 16 through 22. This periodic opening of the isolation valves will continue until a lock-up condition of the non- drive and driven wheels 34 and 36 is again detected. After the lock-up condition of the non-driven and driven wheels is detected, the periodic opening of the isolation valves 32 and 38 is terminated isolating the brake actuators 16 through 22 from the master brake cylinder 10. The first and second ABS controllers will then operate as previously described with the first and second ABS controls 48 and 56 controlling the brake fluid pressure at a level which provides maximum non-locking braking torque to the non-driven and driven wheels.

In a vehicle in which all four wheels are driven by the engine, the first ABS control may be associated with either the front or the rear wheels or the first ABS control may be replaced with an ABS control similar to the second ABS control.

As can be seen from the above description, the anti-lock brake system pulses the driving torque applied to the driven wheels to detect the transition of the driven wheels from a low friction (low mu) road surface to a high friction (high mu) road surface which eliminates the need for an electrically driven hydraulic pump.

It is recognized that those skilled in the art may make certain changes or improvements in the anti-lock brake system described above and shown in the drawings without departing from the spirit of the invention as set forth in the appended claims.

What is claimed is:

1. An anti-lock brake control system for vehicles having at least one non-driven wheel, at least one driven wheel, an engine for providing a driving torque to the at least one driven wheel and means for supplying pressurized brake fluid to a first brake actuator associated with the at least one non-driven wheel and a second brake actuator associated with the at least one driven wheel, said control system comprising:

a normally open first isolation valve connected between the first brake actuator and the means for supplying pressurized brake fluid;

a normally closed first dump valve connected between the first brake actuator and a first fluid reservoir;

wheel speed sensor means for detecting the rotational speed of the at least one non-driven wheel to generate first wheel speed signals;

a first ABS control having means for detecting a lock-up condition of the at least one non-driven wheel in response to said first wheel speed signals, and means responsive to the detection of said lock-up condition of the at least one non-driven wheel to selectively close said first isolation valve and selectively open said first dump valve to reduce the fluid pressure applied to the first brake actuator to maintain a maximum non-locking brake torque applied to the non-driven wheels;

a normally open second isolation valve connected between the second brake actuator and the means for supplying pressurized brake fluid;

a normally closed second dump valve connected between said second brake actuator and a second fluid reservoir;

second wheel speed sensor means for detecting the rotational speed of the at least one driven wheel to generate second wheel speed signals; and a second ABS control having means for detecting a lock-up condition of the at least one driven wheel in response to said second wheel speed signals, means for periodically increasing the speed of the engine in response to the detection of said lock-up condition to periodically increase the torque applied to said at least one driven wheel, means for selectively closing said second isolation valve and opening said second dump valve to reduce the brake fluid pressure being applied to the second brake actuator to maintain a maximum non-locking braking torque applied to said driven wheels, and means responsive to said wheel speed signals indicating a decrease in the rotational speed of said at least one driven wheel being less than a predetermined value in response to a termination of the increased torque being applied to the at least one driven wheel to terminate the periodic increasing of the speed of the engine and to open said second isolation valve to increase brake fluid pressure being applied to the second brake actuator, said predetermined value of the decrease in the rotational speed of the at least one driven wheel being selected to indicate the transition of said at least one driven wheel from a low friction road surface to a high friction road surface.

2. The anti-lock brake system of claim 1 wherein said first ABS control is responsive to said second ABS control terminating the periodic increasing of the speed of the engine to open said first isolation valve increasing the brake fluid pressure being applied to the brake actuator of the non-driven wheel to increase the braking torque applied to said non-driven wheel on said high friction road surface.

3. The anti-lock brake system of claim 1 wherein said second ABS control further has means for delaying the closing of said second isolation valve to provide a higher brake fluid pressure to the second brake actuator to compensate for the increased driving torque being applied to the driven wheels by the engine.

4. The anti-lock brake system of claim 1 wherein said second ABS further has means for periodically opening said second isolation valve after being closed in response to said detection of said lock-up condition to increase the brake fluid pressure being applied to the second brake actuator to increase the braking torque of the second brake actuator.

5. The anti-lock brake system of claim 1 wherein said vehicle is a four wheel vehicle having two non-driven wheels and two driven wheels.

6. The anti-lock brake system of claim 1 wherein said means for supplying a pressurized brake fluid comprises a master brake cylinder responsive to the displacement of a brake pedal to supply said pressurized brake fluid and a brake light switch activated in response to the displacement of the brake pedal to generate a brake signal and wherein said first and second ABS controls are further responsive to a simultaneous occurrence of said brake signal with at least one of said first and second wheel speed signals for detecting said lock-up condition of at least one wheel of the non-driven and driven wheels.

7. The anti-lock brake control system of claim 6 wherein the engine of the vehicle has an air intake manifold and a throttle valve disposed in the air intake manifold to control the air flow to the engine and therefore the speed of the engine, said means for periodically increasing the speed of the engine is means for periodically displacing said throttle valve from an idle position to a preselected open position to increase the speed of the engine by a predetermined amount.

8. The anti-lock brake control of claim 7 wherein said means for periodically displacing said throttle valve is a throttle position solenoid activated in response to periodic signals generated by said second ABS control.

9. A control system for an anti-lock brake system of a four wheel vehicle for detecting the transition of the wheels of the vehicle from a low friction road surface to a high friction road surface, the vehicle having a pair of non-driven wheels, a pair of driven wheels, an engine providing a driving torque to the driven wheels, a brake actuator associated with each of the non-driven and each of the driven wheels and means for supplying brake fluid under pressure to the brake actuators to produce a braking torque, the control system comprising:

a normally open first isolation valve connected between the means for supplying brake fluid under pressure and the brake actuators associated with the driven wheels;

a normally closed first dump valve connected between the brake actuators associated with driven wheels;

wheel speed sensor means for generating driven wheel speed signals having a value corresponding to the rotational speed of the driven wheels;

a first ABS control having means for detecting a lock-up condition of the driven wheels in response to said driven wheel speed signals, means for periodically increasing the speed of the engine to increase the driving torque applied to the driven wheels in response to detecting said lock-up condition, means responsive to the detection of said lock-up condition for selectively closing said first isolation valve and selectively opening said dump valve to control the brake fluid pressure being applied to the brake actuators associated with the driven wheels to maintain a maximum non-locking braking torque, and means responsive to said driven wheel speed signals indicating a decrease in the rotational speed of the driven wheels being less than a predetermined value each time the periodic increased engine speed is terminated, to terminate the periodic increasing of the speed of the engine and to selectively open said isolation valve and close said dump valve to increase the brake fluid pressure being applied to the brake actuators associated with the driven wheels, said predetermined value of the decrease in the rotational speed of the driven wheels being selected to indicate a transition of said driven wheels from a low friction road surface to a high friction road surface.

10. The control system of claim 9 further comprising a second ABS control controlling the brake fluid pressure being applied to the brake actuators associated with the non-driven wheels, said first and second ABS controls are responsive to a lock-up condition being detected by at least one of said first and second ABS control to control the brake fluid pressure being applied to the fluid actuators associated with said non-driven and driven wheels to maintain a maximum non-locking braking torque and to activate said first ABS control to periodically increase the speed of the engine.

11. The braking system of claim 10 wherein said means for selectively closing said isolation valve associated with the driven wheels delays a first closing of said isolation valve for a preselected period of time after the detection of a lock-up condition, said period of time selected to provide a higher brake fluid pressure to the brake actuators associated with the driven wheels causing said brake actuators to generate a braking torque greater than the driving torque being supplied to the driven wheels when the engine is operating at said increased speed.

12. The braking system of claim 10 wherein the means for supplying a pressurized brake fluid comprises:

a master brake cylinder responsive to the displacement of a brake pedal to supply said pressurized brake fluid; and a brake light switch activated in response to the displacement of the brake pedal to generate a brake signal; and wherein said ABS control is further responsive to said brake signal in conjunction with said driven wheel speed signals for detecting said lock-up condition.

13. The braking system of claim 12 wherein the engine of the vehicle has an air intake manifold and a throttle valve disposed in the air intake manifold controlling the air flow to the engine and therefore the speed of the engine, said means for periodically increasing the speed of the engine is means for displacing said throttle valve from an idle position to a preselected open position to increase the speed of the engine by a preselected amount.

14. The braking system of claim 13 wherein said means for actuating said throttle valve is a throttle position solenoid activated in response to periodic signals generated by the first ABS control.

15. A method for detecting the transition of the driven wheels of a vehicle from a low friction road surface to a high friction road surface during an anti-lock braking mode of operation comprising the steps of:

detecting the displacement of a brake pedal from a rest position to a brake application position to generate a brake signal;

measuring the rotational speed of the driven wheels to generate wheel speed signals;

detecting a wheel lock-up condition in response to said brake signal and to said wheel speed signals indicating at least one of the driven wheels is decelerating at a rate greater than a predetermined rate;

selectively closing a normally open isolation valve connected between a master brake cylinder and the brake actuators of the driven wheels in response to the detection of said lock-up condition;

selecting opening a normally closed dump valve connected to said brake actuators of the driven wheels in response to said detection of said lock-up condition, said opening of said dump valve controlling the brake fluid pressure being applied to the brake actuators of the driven wheels to maintain a maximum non-locking braking torque applied to said driven wheels;

periodically increasing the driving torque being applied to the driven wheels;

detecting the change in the deceleration of the driven wheels in response to a periodic termination of the driving torque applied to the driven wheels;

terminating the periodic increasing of the driving torque applied to the driven wheels when the change in the deceleration of the driven wheels is less than a predetermined change indicative of the transition of the driven wheels from a low friction road surface to a high friction road surface; and selectively opening the isolation valve to increase the brake fluid pressure being applied to the brake actuators of said driven wheels in response to said change in the deceleration of said driven wheels being less than said predetermined change to increase the braking torque applied to the driven wheels.

16. The method of claim 15 wherein said engine has an air intake manifold and a throttle valve disposed in said air intake manifold to control the speed of the engine, said step of periodically increasing the driving torque applied to the driven wheels comprises the step of periodically opening said throttle valve from an idle position to a preselected open position to increase the engine speed.

17. The method of claim 16 wherein said step of periodically opening said throttle valve comprises the steps of:

periodically generating throttle valve signals; and activating with said throttle valve signals a throttle position solenoid connected to said throttle valve to displace said throttle valve from said idle position to said preselected position.

18. An anti-lock braking system for a vehicle having a pair of driven wheels, a pair of non-driven wheels, an engine proving a driving torque to the driven wheels, a brake actuator associated with each of the driven and each of the non-driven wheels, and means for supplying pressurized brake fluid to said actuators to generate a braking torque, said braking system comprising:

means for detecting a lock-up condition of at least one of said wheels in response to a change in the deceleration of said at least one of said wheels being greater than a critical value in response to a pressurized brake fluid being supplied to said brake actuators;

means for periodically increasing the speed of the engine in response to the detection of said lock-up condition to periodically increase the driving torque applied to the driven wheels;

means for controlling the pressure of the brake fluid being applied to the brake actuators to maintain a maximum non-locking braking torque applied to said pair of driven and said pair of non-driven wheels;

means responsive to the change in the speed of said driven wheels being less than a preselected value in response to the periodic decreasing of the engine speed to terminate the periodic increasing of the engine speed and to increase the brake fluid pressure being applied to said brake actuators, said preselected value being indicative of the engagement of said driven wheels with a high friction surface.

* * * * *

UNITED STATES PATENT AND TRADEMARK OFFICE
CERTIFICATE OF CORRECTION

PATENT NO. : 5,449,049

DATED : September 12, 1995

INVENTOR(S) : Peter Every

It is certified that error appears in the above-identified patent and that said Letters Patent is hereby corrected as shown below:

In column 10, line 28, after "engine", delete the word "proving" and insert therein -- providing --.

In column 8, line 68, after "fluid", delete the word "and".

Signed and Sealed this

Fourth Day of June, 1996

*Attest:*

BRUCE LEHMAN

*Attesting Officer*     *Commissioner of Patents and Trademarks*